US011965978B2

(12) United States Patent
Ali et al.

(10) Patent No.: US 11,965,978 B2
(45) Date of Patent: Apr. 23, 2024

(54) CALIBRATION PIPELINE FOR ESTIMATING SIX DEGREES OF FREEDOM (6DoF) ALIGNMENT PARAMETERS FOR AN AUTONOMOUS VEHICLE

(71) Applicant: GM Global Technology Operations LLC, Detroit, MI (US)

(72) Inventors: Kamran Ali, Troy, MI (US); Wende Zhang, Birmingham, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 195 days.

(21) Appl. No.: 17/511,959

(22) Filed: Oct. 27, 2021

(65) Prior Publication Data

US 2023/0126100 A1    Apr. 27, 2023

(51) Int. Cl.
| | |
|---|---|
| *G01S 7/40* | (2006.01) |
| *B60W 50/00* | (2006.01) |
| *B60W 60/00* | (2020.01) |

(52) U.S. Cl.
CPC .............. *G01S 7/40* (2013.01); *B60W 50/00* (2013.01); *B60W 2050/0052* (2013.01); *B60W 2050/0083* (2013.01); *B60W 60/001* (2020.02); *B60W 2420/408* (2024.01); *B60W 2556/50* (2020.02)

(58) Field of Classification Search
CPC ..... G01S 7/40; B60W 50/00; B60W 2556/60; B60W 60/001; B60W 2050/0052; B60W 2050/0083; B60W 2420/52
See application file for complete search history.

(56) References Cited

U.S. PATENT DOCUMENTS

| | | |
|---|---|---|
| 2017/0300759 A1 | 10/2017 | Beard et al. |
| 2019/0266748 A1 | 8/2019 | Ahmad et al. |
| 2020/0150677 A1* | 5/2020 | Walters ................. B63H 25/04 |
| 2020/0226790 A1* | 7/2020 | Alvarez ................. G01S 13/931 |

(Continued)

FOREIGN PATENT DOCUMENTS

CN          112526513 A      3/2021

OTHER PUBLICATIONS

Haarbach, Adrian. Multiview ICP, Aug. 2015, pp. 1-9.
(Continued)

*Primary Examiner* — Mahmoud S Ismail
*Assistant Examiner* — Gabriel Anfinrud
(74) *Attorney, Agent, or Firm* — Vivacqua Crane, PLLC (57) ABSTRACT

A calibration pipeline for 6DoF alignment parameters for an autonomous vehicle includes an automated driving controller instructed to receive inertial measurement unit (IMU) poses and final radar poses and determine smoothened IMU poses from the IMU poses and smoothened final radar poses from the final radar poses. The automated driving controller aligns the smoothened IMU poses and the smoothened final radar poses with one another to create a plurality of radar-IMU A, B relative pose pairs. The automated riving controller determines a solution yielding a threshold number of inliers of further filtered radar-IMU A, B relative pose pairs, randomly samples the further filtered radar-IMU A, B relative pose pairs with replacements several times to determine a stream of filtered radar-IMU A, B relative pose pairs, and solves for a solution X for the stream of filtered radar-IMU A, B relative pose pairs.

20 Claims, 3 Drawing Sheets

(56) References Cited

U.S. PATENT DOCUMENTS

| | | | |
|---|---|---|---|
| 2021/0031795 A1* | 2/2021 | Bariant | B60W 60/001 |
| 2021/0063560 A1* | 3/2021 | Bosse | G01S 13/505 |
| 2022/0066544 A1* | 3/2022 | Kwon | G06T 7/20 |
| 2022/0153276 A1* | 5/2022 | Steyer | G06T 7/62 |
| 2022/0205786 A1 | 6/2022 | Liu et al. | |
| 2022/0300745 A1 | 9/2022 | Yang et al. | |
| 2022/0319050 A1* | 10/2022 | Mu | H04N 23/6812 |

OTHER PUBLICATIONS

Schneider, et al. Odometry-based Online Extrinsic Sensor Calibration, RSJ International Conference on Intelligent Robots and Systems (IROS), Nov. 2013, pp. 1287-1292, IEEE, Tokyo, Japan.

Fantoni, et al. Accurate and automatic alignment of range surfaces, Oct. 2012, pp. 1-8, Department of Computer Science—University of Verona, Italy.

Andreff, et al. On-line Hand-Eye Calibration, 2nd International Conference on 3-D Digital Imaging and Modeling, Oct. 1999, pp. 430-436, National Research Council of Canada, Ottawa, Canada.

He, et al. M2DP: A Novel 3D Point Cloud Descriptor and Its Application in Loop Closure Detection, Oct. 2016, pp. 1-7.

Tsai, et al. A New Technique for Fully Autonomous and Efficient 3D Robotics Hand/Eye Calibration, IEEE Transactions on Robotics and Automation, Jun. 1989, pp. 345-358, vol. 5, No. 3 IEEE.

Furrer, et al. Evaluation of Combined Time-Offset Estimation and Hand-Eye Calibration on Robotic Datasets, Sep. 2017, pp. 1-15, Zurich, Switzerland.

Kellner, Dominik. Instantaneous Ego-Motion Estimation using Multiple Doppler Radars, May 2015, pp. 1-7.

Markley, et al. Averaging Quaternions, Journal of Guidance, Control, and Dynamics, Jul. 2007, pp. 1-11.

Anderson, et al. RANSAC for Motion-Distorted 3D Visual Sensors, RSJ International Conference on Intelligent Robots and Systems (IROS), Nov. 2013, pp. 2093-2099, IEEE, Tokyo, Japan.

* cited by examiner

CALIBRATION PIPELINE FOR ESTIMATING SIX DEGREES OF FREEDOM (6DoF) ALIGNMENT PARAMETERS FOR AN AUTONOMOUS VEHICLE

INTRODUCTION

The present disclosure relates to a calibration pipeline for estimating six degrees of freedom (6DoF) alignment parameters between a radar sensor and a center of gravity of an autonomous vehicle.

An autonomous vehicle may drive from a starting point to a predetermined destination with limited or no human intervention using various in-vehicle technologies and sensors. Autonomous vehicles include a variety of autonomous sensors such as, but not limited to, cameras, radars, LiDAR, global positioning systems (GPS), and inertial measurement units (IMU) for detecting a vehicle's exterior surroundings and status. However, if a camera or radar is moved from its mounting when the autonomous vehicle is repaired, undergoes an accident, or experiences a significant pothole or obstruction while driving, then the camera or radar sensor needs to be recalibrated, which is a manual and often cumbersome process. Furthermore, if the autonomous vehicle undergoes a wheel alignment, then the cameras and radars also require recalibration. This is because the wheels of the vehicle determine the direction of travel, which affects the aiming of the cameras and radars.

Millimeter wave (mmWave) radar is one specific technology that may be used with autonomous vehicles. For example, millimeter wave radar may be used to warn of forward collisions and backward collisions, to implement adaptive cruise control and autonomous parking, and to perform autonomous driving on streets and highways. It is to be appreciated that millimeter wave radar has advantages over other sensor systems in that millimeter wave radar may work under most types of weather and in light and darkness. A millimeter wave radar may measure the range, angle, and Doppler (radial velocity) of moving objects. A radar point cloud may be determined based on the data collected by the millimeter wave radar based on various clustering and tracking algorithms, which may be used to determine location, velocity, and trajectory of objects. However, radar point clouds based on data collected by millimeter wave radars, and in particular low-cost signal system on chip (SoC) based millimeter wave radars, may be too noisy and sparse to be used for robust and accurate pose estimation required for dynamic calibration purposes.

Thus, while current autonomous vehicles achieve their intended purpose, there is a need in the art for a system and method for estimating 6DoF alignment parameters between a radar sensor and a center of gravity of an autonomous vehicle based on noisy and sparse radar point clouds.

SUMMARY

According to several aspects, a calibration pipeline for estimating six degrees of freedom (6DoF) alignment parameters for an autonomous vehicle is disclosed. The calibration pipeline includes an automated driving controller instructed to receive inertial measurement unit (IMU) poses and final radar poses. The IMU poses are based on data collected by an IMU and a global positioning system (GPS) of the autonomous vehicle and the final radar poses are based on data collected from a radar sensor of the autonomous vehicle. The automated driving controller instructed to determine smoothened IMU poses from the IMU poses and smoothened final radar poses from the final radar poses based on either a moving average filter or a moving median filter. The automated driving controller is instructed to align the smoothened IMU poses and the smoothened final radar poses with one another to create a plurality of radar-IMU A, B relative pose pairs. The automated driving controller is instructed to determine a solution yielding a threshold number of inliers of further filtered radar-IMU A, B relative pose pairs based on the plurality of radar-IMU A, B relative pose pairs. The automated driving controller is instructed to randomly sample the further filtered radar-IMU A, B relative pose pairs with replacements several times to determine a stream of filtered radar-IMU A, B relative pose pairs. Finally, the automated driving controller is instructed to solve for a solution X for the stream of filtered radar-IMU A, B relative pose pairs, where the solution X indicates the 6DoF alignment parameters.

In an aspect, the automated driving controller is instructed to further refine the solution X by performing a non-linear minimization of an error term based on a non-linear optimization routine, where the non-linear optimization routine is executed until convergence of the error term.

In another aspect, the non-linear optimization routine is a non-linear least-squares routine.

In yet another aspect, the error term is a sum of a measure of orthogonality of a rotation part of a current estimate of the solution X obtained in a previous iteration, a norm of a rotation part of the solution X of the previous iteration, and a Mahalanobis distance of $\{AX-XB\}$ terms.

In an aspect, the smoothened IMU poses and the smoothened final radar poses are aligned with one another based on a time offset correlation coefficient.

In another aspect, the time offset correlation coefficient indicates a system time offset between the smoothened IMU poses and the smoothened final radar poses.

In yet another aspect, the time offset correlation coefficient is determined by correlating angular velocity magnitudes determined based on the smoothened IMU poses with angular velocity magnitudes determined based on the smoothened final radar poses.

In an aspect, a k-th nearest neighbor (kNN) technique is used to determine all possible A, B relative pose pairs for the solution yielding a threshold number of inliers of further filtered radar-IMU A, B relative pose pairs.

In another aspect, all possible A, B relative pose pairs are filtered by two random sample consensus (RANSAC) filters that are based on a hand-eye calibration problem based on the form of an AX=XB solver.

In yet another aspect, the solution X for the stream of filtered radar-IMU A, B relative pose pairs is determined by an iterative solver.

In an aspect, the iterative solver is an unscented Kalman filter.

In another aspect, the smoothened IMU poses and the smoothened final radar poses are determined based on a spherical linear interpolation (SLERP) based moving average filter.

In an aspect, a method for estimating 6DoF alignment parameters for an autonomous vehicle is disclosed. The method includes receiving, by an automated driving module, IMU poses and final radar poses, where the IMU poses are based on data collected by an IMU and a GPS of the autonomous vehicle and the final radar poses are based on data collected from a radar sensor of the autonomous vehicle. The method also includes determining, by the automated driving module, smoothened IMU poses from the IMU poses and smoothened final radar poses from the final radar poses based on either a moving average filter or a moving median filter. The method further includes aligning the smoothened IMU poses and the smoothened final radar poses with one another to create a plurality of radar-IMU A, B relative pose pairs. The method also includes determining a solution yielding a threshold number of inliers of further filtered radar-IMU A, B relative pose pairs based on the plurality of radar-IMU A, B relative pose pairs. The method includes randomly sampling the further filtered radar-IMU A, B relative pose pairs with replacements several times to determine a stream of filtered radar-IMU A, B relative pose pairs. Finally, the method includes solving for a solution X for the stream of filtered radar-IMU A, B relative pose pairs, where the solution X indicates the 6DoF alignment parameters.

In an aspect, the method includes further refining the solution X by performing a non-linear minimization of an error term based on a non-linear optimization routine. The non-linear optimization routine is executed until convergence of the error term.

In another aspect, the method includes determining the error term, wherein the error term is a sum of a measure of orthogonality of a rotation part of a current estimate of the solution X obtained in a previous iteration, a norm of a rotation part of the solution X of the previous iteration, and a Mahalanobis di stance of {AX−XB} terms.

In yet another aspect, the method includes aligning the smoothened IMU poses and the smoothened final radar poses with one another based on a time offset correlation coefficient. The time offset correlation coefficient indicates a system time offset between the smoothened IMU poses and the smoothened final radar poses.

In an aspect, the method includes determining all possible A, B relative pose pairs for the solution yielding a threshold number of inliers of further filtered radar-IMU A, B relative pose pairs based on a kNN technique, and filtering the all possible A, B relative pose pairs by two RANSAC filters that are based on a hand-eye calibration problem based on the form of an AX=XB solver.

In another aspect, the method includes determining the solution X for the stream of filtered radar-IMU A, B relative pose pairs by an iterative solver.

In yet another aspect, the method includes determining the smoothened IMU poses and the smoothened final radar poses based on a SLERP based moving average filter.

In another aspect, a calibration pipeline for estimating 6DoF alignment parameters for an autonomous vehicle is disclosed. The calibration pipeline includes an automated driving controller instructed to receive IMU poses and final radar poses. The IMU poses are based on data collected by an IMU and a GPS of the autonomous vehicle and the final radar poses are based on data collected from a radar sensor of the autonomous vehicle. The automated driving controller is instructed to determine smoothened IMU poses from the IMU poses and smoothened final radar poses from the final radar poses based on either a moving average filter or a moving median filter. The automated driving controller is instructed to align the smoothened IMU poses and the smoothened final radar poses with one another to create a plurality of radar-IMU A, B relative pose pairs. The automated driving controller is instructed to determine a solution yielding a threshold number of inliers of further filtered radar-IMU A, B relative pose pairs based on the plurality of radar-IMU A, B relative pose pairs. The automated driving controller is instructed to randomly sample the further filtered radar-IMU A, B relative pose pairs with replacements several times to determine a stream of filtered radar-IMU A, B relative pose pairs. The automated driving controller is instructed to solve for a solution X for the stream of filtered radar-IMU A, B relative pose pairs, where the solution X indicates the 6DoF alignment parameters. Finally, the automated driving controller is instructed to further refine the solution X by performing a non-linear minimization of an error term based on a non-linear optimization routine, where the non-linear optimization routine is executed until convergence of the error term.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
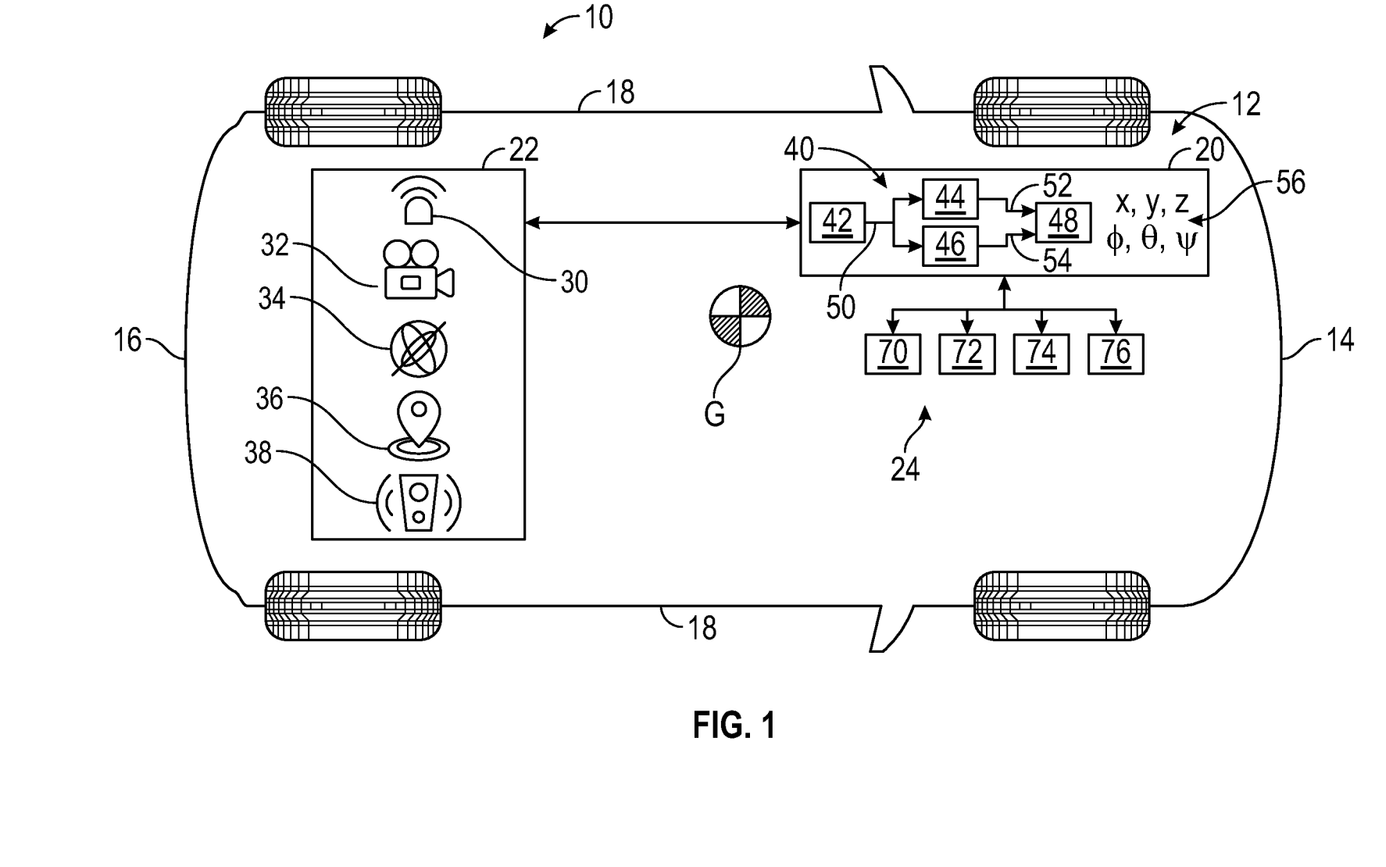
FIG. 1 is a schematic diagram of an autonomous vehicle including a plurality of radar sensors and an automated driving controller, where the automated driving controller includes a pose estimation pipeline for determining calibration coordinates, according to an exemplary embodiment.

Referring to FIG. 1, an exemplary autonomous vehicle 10 is illustrated. The autonomous vehicle 10 has an autonomous driving system 12 that includes an automated driving controller 20 in electronic communication with a plurality of on-board autonomous sensors 22 and a plurality of vehicle systems 24. In the example as shown in FIG. 1, the plurality of on-board autonomous sensors 22 include one or more radar sensors 30, one or more cameras 32, an inertial measurement unit (IMU) 34, a global positioning system (GPS) 36, and LiDAR 38 that are mounted to the autonomous vehicle 10, however, it is to be appreciated that additional sensors may be used as well. The plurality of radar sensors 30 may be mounted to the front 14, the rear 16, and/or the sides 18 of the autonomous vehicle 10 to detect objects in an environment surrounding the autonomous vehicle 10. Each radar sensor 30 performs a plurality of individual scans of the environment surrounding the autonomous vehicle 10 to obtain data in the form of a radar point cloud including a plurality of detection points. Both the IMU 34 and the GPS 36 directly measure vehicle state. Specifically, the IMU 34 determines an angular rotation rate, acceleration, and heading of the autonomous vehicle 10, and the GPS 36 determines position, velocity, and time of the autonomous vehicle 10.

The automated driving controller 20 includes a pose estimation pipeline 40 including a scan aggregator and filter 42, an inertial navigation system (INS) module 44, a scan matching and radar pose estimation module 46, and a calibration module 48. The scan aggregator and filter 42 determines an aggregated filtered data point cloud 50 that is sent the scan matching and radar pose estimation module 46. A timestamp of the scan associated with the aggregated filtered data point cloud 50 is sent to the INS module 44. The INS module 44 determines time-matched IMU poses 52 with corresponding radar poses that are sent to the calibration module 48. The scan matching and radar pose estimation module 46 estimates final radar poses 54 that are sent to the calibration module 48.

The calibration module 48 determines six degrees of freedom (6DoF) alignment parameters 56 between a radar sensor 30 and center of gravity G of the autonomous vehicle 10 based on corresponding IMU poses 52 and final radar poses 54. The 6DoF alignment parameters 56 include x, y, and z coordinates as well as a roll $\varphi$, pitch $\theta$, and yaw $\psi$ of the autonomous vehicle 10. In an embodiment, the 6DoF alignment parameters 56 are radar-to-vehicle calibration parameters that are employed to automatically align the radar sensors 30 with the center of gravity G of the autonomous vehicle 10. In an alternative embodiment, the 6DoF alignment parameters 56 are vehicle-to-radar calibration parameters.

It is to be appreciated that the radar point clouds obtained by the radar sensors 30 may be sparse, and in many instances include noisy and jittery data, ghost detections, reflections, and clutter. The scan aggregator and filter 42 filters and aggregates the radar point clouds obtained by the radar sensors 30 to reduce the impact of various noise sources, as well as to also increase the density of the point cloud scans. However, the scan aggregator and filter 42 may reduce but does not completely eliminate the noise in the radar point clouds. As explained below, the calibration module 48 of the pose estimation pipeline 40 determines the 6DoF alignment parameters 56 based on the pose estimates that are determined based on noisy point clouds obtained by the radar sensors 30 with sufficient accuracy so as to automatically align the radar sensors 30 with the center of gravity G of the autonomous vehicle 10.

The autonomous vehicle 10 may be any type of vehicle such as, but not limited to, a sedan, truck, sport utility vehicle, van, or motor home. In one non-limiting embodiment, the autonomous vehicle 10 is a fully autonomous vehicle including an automated driving system (ADS) for performing all driving tasks. Alternatively, in another embodiment, the autonomous vehicle 10 is a semi-autonomous vehicle including an advanced driver assistance system (ADAS) for assisting a driver with steering, braking, and/or accelerating. The automated driving controller 20 determines autonomous driving features such as perception, planning, localization, mapping, and control of the autonomous vehicle 10. Although FIG. 1 illustrates the automated driving controller 20 as a single controller, it is to be appreciated that multiple controllers may be included as well. The plurality of vehicle systems 24 include, but are not limited to, a brake system 70, a steering system 72, a powertrain system 74, and a suspension system 76. The automated driving controller 20 sends vehicle control commands to the plurality of vehicle systems 24 to guide the autonomous vehicle 10.

The radar sensors 30 may be a short range radar for detecting objects from about 1 to about 20 meters from the autonomous vehicle 10, a medium range radar for detecting objects from about 1 to about 60 meters from the autonomous vehicle 10, or a long range radar for detecting objects up to about 260 meters from the autonomous vehicle 10. In one embodiment, the one or more of the radar sensors 30 include millimeter wave (mmWave) radar sensors, and in particular low-cost signal system on chip (SoC) based millimeter wave radar sensors having a limited field-of-view. In another embodiment, the radar sensors 30 include one or more 360 degree rotating radar sensors.

Figure 2:
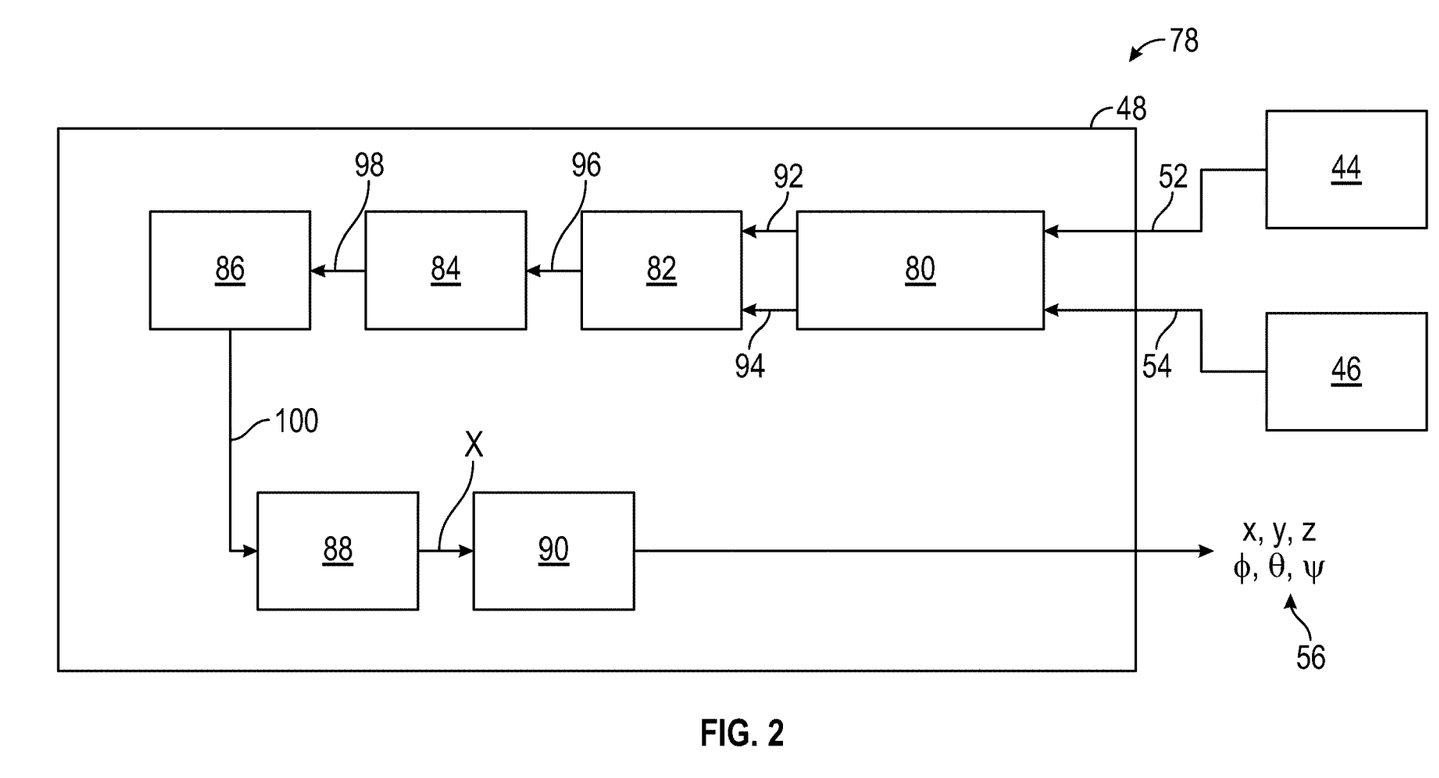
FIG. 2 is a block diagram illustrating a calibration pipeline for estimating six degrees of freedom (6DoF) alignment parameters, according to an exemplary embodiment.

Referring now to FIG. 2, a block diagram illustrating the calibration module 48 is shown, where the calibration module 48 includes a calibration pipeline 78 having a smoothening sub-module 80, a time alignment sub-module 82, a pose filtering sub-module 84, a pose pair sampling sub-module 86, an iterative-solver sub-module 88, and a refinement sub-module 90. The calibration pipeline 78 begins at the smoothening sub-module 80. The smoothening sub-module 80 receives the IMU poses 52 from the INS module 44 and the final radar poses 54 from the scan matching and radar pose estimation module 46. As mentioned above, the IMU poses 52 are based on data collected by the IMU 34 and the GPS 36 (FIG. 1), and the final radar poses 54 are based on the data collected from one of the radar sensors 30 (FIG. 1). The smoothening sub-module 80 determines smoothened IMU poses 92 and smoothened final radar poses 94 based on either a moving average or a moving median filter.

The moving average filter or the moving median filter reduces multipath noise in the final radar poses 54. It is to be appreciated that multipath noise is inherent in radar-based sensing applications. In one specific embodiment, the smoothening sub-module 80 determines the smoothened IMU poses 92 and smoothened final radar poses 94 based on a spherical linear interpolation (SLERP) based moving average filter, however, it is to be appreciated that other moving average filters or moving median filters may be used as well.

The smoothened IMU poses 92 and the smoothened final radar poses 94 are received by the time alignment sub-module 82, which determines a time offset correlation coefficient. The time offset correlation coefficient indicates a system time offset between the smoothened IMU poses 92 and the smoothened final radar poses 94. The system time offset between the smoothened IMU poses 92 and the smoothened final radar poses 94 consequently increases the error in the 6DoF alignment parameters 56. The time offset correlation coefficient is determined by correlating angular velocity magnitudes determined based on the smoothened IMU poses 92 with angular velocity magnitudes determined based on the smoothened final radar poses 94. The smoothened IMU poses 92 and the smoothened final radar poses 94 are then aligned with one another based on the time offset correlation coefficient to create a plurality of radar-IMU A, B relative pose pairs 96. The variable A of the AX=XB solver represents a transformation between two relative radar poses based on the radar sensor 30 (FIG. 1), B is a transformation between two relative IMU poses determined by the IMU 34 (FIG. 1), and X is the transformation between the radar sensor 30 and the IMU 34.

Even after the time alignment executed by the time alignment sub-module 82, the plurality of radar-IMU A, B relative pose pairs 96 may still be too noisy to meet accuracy requirements for calibration. Thus, the pose filtering sub-module 84 filters the plurality of radar-IMU A, B relative pose pairs 96 to determine a solution yielding a threshold number of inliers N of further filtered radar-IMU A, B relative pose pairs 98. It is to be appreciated that threshold number of inliers N depends upon the density of the radar point clouds, however, the threshold number of inliers N results in at least about five detection points being selected. The threshold number of inliers N may range from about fifty percent of the detection points being filtered out to about ninety-nine percent of the detection points being filtered out. In one example, the threshold number of inliers N results in about ninety percent of the detection points being filtered out. The threshold number of inliers N is determined based on the specific application, where a higher percentage of inliers being filtered out results in more accurate data but may result in fewer detection points being considered.

In one embodiment, a k-th nearest neighbor (kNN) technique is used to determine all possible further filtered radar-IMU A, B relative pose pairs 98. It is to be appreciated that A is calculated based on two radar poses (i.e., a relative radar pose pair), where the relative radar poses are k-th nearest neighbors of one another in time. For example, if k=3, then a relative radar pose A is be determined based on $P_R(i-3)^{-1} P_R(i)$, where i represents a sample identifier in time (e.g., sample 1, sample 2, etc.), $P_R$ represents a radar pose, and $P_R(i-3)^{-1}$ represents an inverse of $P_R(i-3)$. Similarly, B is calculated based on two IMU poses (i.e., a relative IMU pose pair), where the relative IMU poses are k-th nearest neighbors of one another in time. If k=3, then a relative IMU pose B is determined as $P_I(i-3)^{-1} P_I(I)$, where $P_I(i-3)^{-1}$ represents an inverse of $P_I(i-3)$ and $P_I$ represents an IMU pose. In still another embodiment, multiple values for the variable k may be used as well. The A, B relative pose pairs are then filtered by two random sample consensus (RANSAC) filters that are based on a hand-eye calibration problem based on the form of an AX=XB solver, where the RANSAC filters determine which A, B relative pose pairs may be used for calibration. In an embodiment, the two RANSAC filters are based on Tsai's technique and Andreff's technique.

Once the threshold number of inliers N of further filtered radar-IMU A, B relative pose pairs 98 have been determined by the pose filtering sub-module 84, the pose pair sampling sub-module 86 then randomly samples the further filtered radar-IMU A, B relative pose pairs 98 with replacements several times to determine a stream of filtered radar-IMU A, B relative pose pairs 100. The specific number of times that the further filtered radar-IMU A, B relative pose pairs 98 are randomly sampled with replacements by the pose pair sampling sub-module 86 depends upon the application. In one embodiment, the pose pair sampling sub-module 86 randomly samples the further filtered radar-IMU A, B relative pose pairs 98 with replacements ten times, so if there are two hundred and fifty further filtered radar-IMU A, B relative pose pairs 98, then the pose pair sampling sub-module 86 then randomly samples the further filtered radar-IMU A, B relative pose pairs 98 twenty five hundred times.

The stream of filtered radar-IMU A, B relative pose pairs 100 are then sent to the iterative-solver sub-module 88, which solves for the solution X one-by-one for each of the stream filtered and randomly sampled radar-IMU A, B relative pose pairs 100. The iterative-solver sub-module 88 may employ any iterative solver to determine the solution X, however, in one embodiment the iterative solver is an unscented Kalman filter. The solution X, which is determined one-by-one for the stream of filtered radar-IMU A, B relative pose pairs 100, is then sent to the refinement sub-module 90. The refinement sub-module 90 further refines the solution X by performing a non-linear minimization of an error term based on a non-linear optimization routine, where the non-linear optimization routine is executed until convergence of the error term. In an embodiment, the non-linear optimization routine is a non-linear least-squares routine such as, but not limited to, the Levenberg-Marquardt algorithm. The solution X indicates the 6DoF alignment parameters 56 (x, y, z and roll $\varphi$, pitch $\theta$, and yaw $\psi$) of the autonomous vehicle 10. Specifically, the solution X is either expressed as a matrix indicating the 6DoF alignment parameters 56 or the solution X is expressed in a form that may be converted into the 6DoF alignment parameters 56.

The error term is a sum of a measure of orthogonality of a rotation part of a current estimate of the solution X that was obtained in the previous iteration, a norm of a rotation part of the solution X of the previous iteration, and a Mahalanobis distance of $\{AX-XB\}$ terms, where $\{AX-XB\}$ is determined by subtracting a product between A and X from a product between A and X. It is to be appreciated that the rotation part of the current estimate of the solution X is always orthogonal and the norm of the rotation part of the solution X is always 1. The A, B pairs of the $\{AX-XB\}$ terms represent the A, B relative pose pairs that are output by the pose pair sampling sub-module 86. The Mahalanobis distance of the $\{AX-XB\}$ term is determined based on a covariance matrix that captures the variation of the $\{AX-XB\}$ term. In an embodiment, the covariance matrix is obtained during factory calibration or test runs of the autonomous vehicle 10 (FIG. 1).

Figure 3:
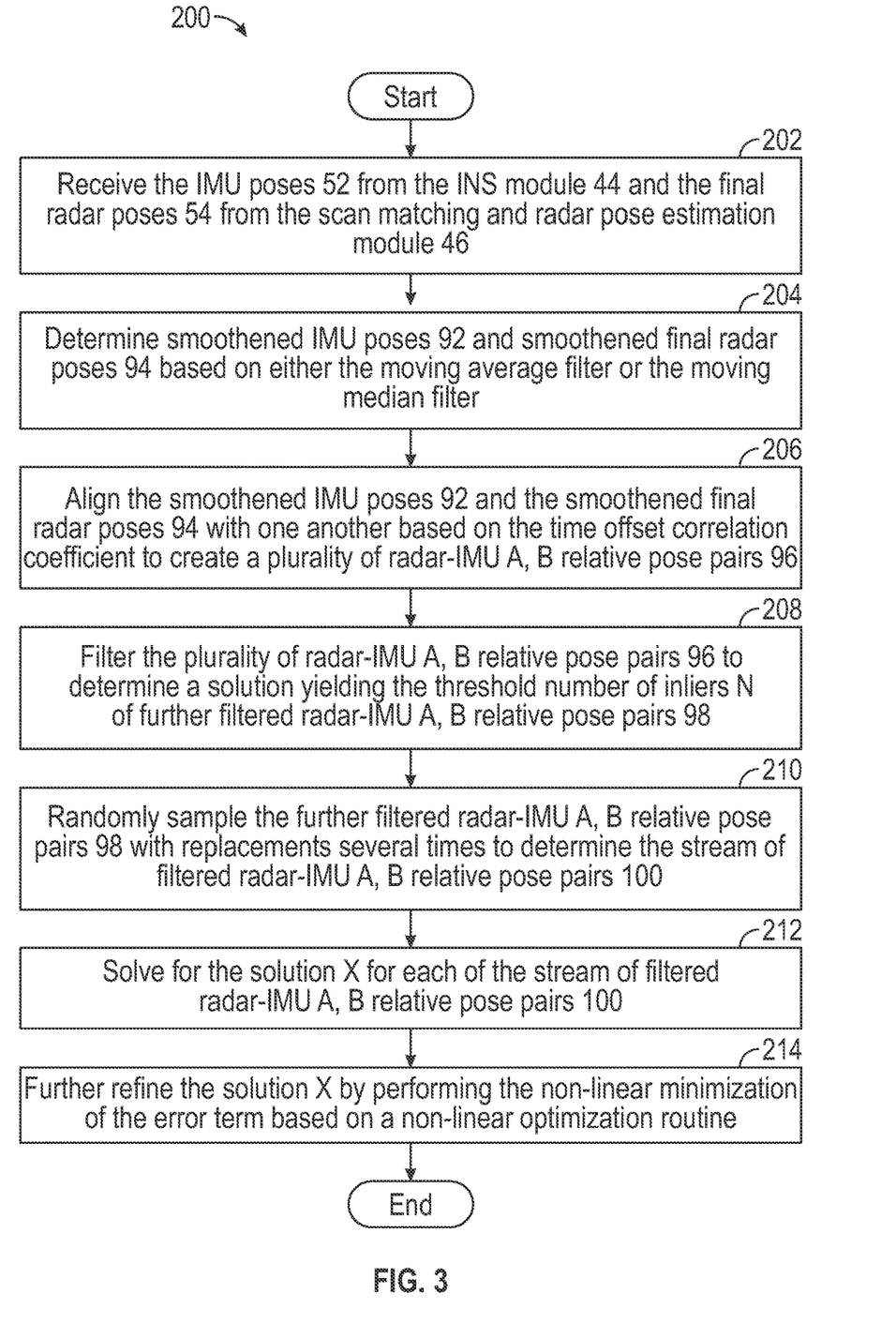
FIG. 3 is a process flow diagram illustrating a method for determining the 6DoF alignment parameters, according to an exemplary embodiment.

FIG. 3 is a process flow diagram illustrating a method 200 for determining the 6DoF alignment parameters 56 (FIG. 1) by the calibration module 48 (FIG. 1). Referring generally to FIGS. 1-3, the method 200 begins at block 202. In block 202, the smoothening sub-module 80 of the calibration module 48 that is part of the automated driving controller 20 receives the IMU poses 52 from the INS module 44 and the final radar poses 54 from the scan matching and radar pose estimation module 46. The method 200 may then proceed to block 204.

In block 204, the smoothening sub-module 80 determines smoothened IMU poses 92 and smoothened final radar poses 94 based on either the moving average filter or the moving median filter. In one specific embodiment, a SLERP based moving average filter is employed.

In block 206, the time alignment sub-module 82 aligns the smoothened IMU poses 92 and the smoothened final radar poses 94 with one another based on the time offset correlation coefficient to create a plurality of radar-IMU A, B relative pose pairs 96. The method 200 may then proceed to block 208.

In block 208, pose filtering sub-module 84 filters the plurality of radar-IMU A, B relative pose pairs 96 to determine a solution yielding the threshold number of inliers N of further filtered radar-IMU A, B relative pose pairs 98. Specifically, as mentioned above, the kNN technique is used to determine all possible A, B relative pose pairs. The A, B relative pose pairs are then filtered by two RANSAC filters that are based on a hand-eye calibration problem based on the form of an AX=XB solver, where the RANSAC filters determine which A, B relative pose pairs may be used for calibration. The method 200 may then proceed to block 210.

In block 210, the pose pair sampling sub-module 86 randomly samples the further filtered radar-IMU A, B relative pose pairs 98 with replacements several times to determine the stream of filtered radar-IMU A, B relative pose pairs 100. The method 200 may then proceed to block 212.

In block 212, the iterative-solver sub-module 88 solves for the solution X for each of the stream of filtered radar-IMU A, B relative pose pairs 100. As mentioned above, the iterative-solver sub-module 88 may employ any iterative solver to determine the solution X, however, in one embodiment the iterative solver is an unscented Kalman filter. The method 200 may then proceed to block 214.

In block 214, the refinement sub-module 90 further refines the solution X by performing the non-linear minimization of the error term based on a non-linear optimization routine. The non-linear optimization routine is executed until convergence of the error term. In an embodiment, the non-linear optimization routine is a non-linear least-squares routine such as, but not limited to, the Levenberg-Marquardt algorithm. The solution X indicates the 6DoF alignment parameters 56 (x, y, z and roll φ, pitch θ, and yaw ψ) of the autonomous vehicle 10. The method 200 may then terminate.

Referring generally to the figures, the disclosed calibration pipeline for the autonomous vehicle provides various technical effects and benefits. Specifically, disclosed pose estimation calibration pipeline determines 6DoF alignment parameters between a specific radar sensor and the center of gravity G of the autonomous vehicle based on noisy point clouds obtained by the radar sensor and the autonomous vehicle's center of gravity. It is to be appreciated that the 6DoF alignment parameters are sufficiently accurate enough so as to automatically align the radar sensor with the center of gravity of the autonomous vehicle.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A calibration pipeline for estimating six degrees of freedom (6DoF) alignment parameters for an autonomous vehicle, the calibration pipeline comprising:
   one or more radar sensors;
   an automated driving controller in electronic communication with the one or more radar sensors, where the automated driving controller is instructed to:
   receive inertial measurement unit (IMU) poses and final radar poses, wherein the IMU poses are based on data collected by an IMU and a global positioning system (GPS) of the autonomous vehicle and the final radar poses are based on data collected from the one or more radar sensors of the autonomous vehicle;
   determine smoothened IMU poses from the IMU poses and smoothened final radar poses from the final radar poses based on either a moving average filter or a moving median filter;
   align the smoothened IMU poses and the smoothened final radar poses with one another to create a plurality of radar-IMU A, B relative pose pairs;
   determine a solution yielding a threshold number of inliers of further filtered radar-IMU A, B relative pose pairs based on the plurality of radar-IMU A, B relative pose pairs;
   randomly sample the further filtered radar-IMU A, B relative pose pairs with replacements more than two times to determine a stream of filtered radar-IMU A, B relative pose pairs;
   solve for a solution X for the stream of filtered radar-IMU A, B relative pose pairs, wherein the solution X indicates the 6DoF alignment parameters, and wherein the solution X indicates the 6DoF alignment parameters of the autonomous vehicle and the 6DoF alignment parameters represent radar-to-vehicle calibration parameters; and
   align the one or more radar sensors with a center of gravity of the autonomous vehicle based on the 6DoF alignment parameters.

2. The calibration pipeline of claim 1, wherein the automated driving controller is instructed to:
   further refine the solution X by performing a non-linear minimization of an error term based on a non-linear optimization routine, wherein the non-linear optimization routine is executed until convergence of the error term.

3. The calibration pipeline of claim 2, wherein the non-linear optimization routine is a non-linear least-squares routine.

4. The calibration pipeline of claim 2, wherein the error term is based on a measure of orthogonality of a rotation part of a current estimate of the solution X obtained in a previous iteration, a norm of a rotation part of the solution X of the previous iteration, and a Mahalanobis distance of {AX−XB} terms.

5. The calibration pipeline of claim 1, wherein the smoothened IMU poses and the smoothened final radar poses are aligned with one another based on a time offset correlation coefficient.

6. The calibration pipeline of claim 5, wherein the time offset correlation coefficient indicates a system time offset between the smoothened IMU poses and the smoothened final radar poses.

7. The calibration pipeline of claim 5, wherein the time offset correlation coefficient is determined by correlating angular velocity magnitudes determined based on the smoothened IMU poses with angular velocity magnitudes determined based on the smoothened final radar poses.

8. The calibration pipeline of claim 1, wherein a k-th nearest neighbor (kNN) technique is used to determine all possible A, B relative pose pairs for the solution yielding a threshold number of inliers of further filtered radar-IMU A, B relative pose pairs.

9. The calibration pipeline of claim 8, wherein the all possible A, B relative pose pairs are filtered by two random sample consensus (RANSAC) filters that are based on a hand-eye calibration problem based on the form of an AX=XB solver.

10. The calibration pipeline of claim 1, wherein the solution X for the stream of filtered radar-IMU A, B relative pose pairs is determined by an iterative solver.

11. The calibration pipeline of claim 10, wherein the iterative solver is an unscented Kalman filter.

12. The calibration pipeline of claim 1, wherein the smoothened IMU poses and the smoothened final radar poses are determined based on a spherical linear interpolation (SLERP) based moving average filter.

13. A method for estimating six degrees of freedom (6DoF) alignment parameters for an autonomous vehicle, the method comprising:
   receiving, by an automated driving module, inertial measurement unit (IMU) poses and final radar poses, wherein the IMU poses are based on data collected by an IMU and a global positioning system (GPS) of the autonomous vehicle and the final radar poses are based on data collected from one or more radar sensors of the autonomous vehicle;

determining, by the automated driving module, smoothened IMU poses from the IMU poses and smoothened final radar poses from the final radar poses based on either a moving average filter or a moving median filter;

aligning the smoothened IMU poses and the smoothened final radar poses with one another to create a plurality of radar-IMU A, B relative pose pairs;

determining a solution yielding a threshold number of inliers of further filtered radar-IMU A, B relative pose pairs based on the plurality of radar-IMU A, B relative pose pairs;

randomly sampling the further filtered radar-IMU A, B relative pose pairs with replacements more than two times to determine a stream of filtered radar-IMU A, B relative pose pairs;

solving for a solution X for the stream of filtered radar-IMU A, B relative pose pairs, wherein the solution X indicates the 6DoF alignment parameters, and wherein the solution X indicates the 6DoF alignment parameters of the autonomous vehicle and the 6DoF alignment parameters represent radar-to-vehicle calibration parameters; and aligning the one or more radar sensors with a center of gravity of the autonomous vehicle based on the 6DoF alignment parameters.

14. The method of claim 13, comprising:

further refining the solution X by performing a non-linear minimization of an error term based on a non-linear optimization routine, wherein the non-linear optimization routine is executed until convergence of the error term.

15. The method of claim 14, comprising:

determining the error term, wherein the error term is based on a measure of orthogonality of a rotation part of a current estimate of the solution X obtained in a previous iteration, a norm of a rotation part of the solution X of the previous iteration, and a Mahalanobis distance of {AX−XB} terms.

16. The method of claim 13, comprising:

aligning the smoothened IMU poses and the smoothened final radar poses with one another based on a time offset correlation coefficient, wherein the time offset correlation coefficient indicates a system time offset between the smoothened IMU poses and the smoothened final radar poses.

17. The method of claim 13, comprising:

determining all possible A, B relative pose pairs for the solution yielding a threshold number of inliers of further filtered radar-IMU A, B relative pose pairs based on a kNN technique; and filtering the all possible A, B relative pose pairs by two RANSAC filters that are based on a hand-eye calibration problem based on the form of an AX=XB solver.

18. The method of claim 13, comprising:

determining the solution X for the stream of filtered radar-IMU A, B relative pose pairs by an iterative solver.

19. The method of claim 13, comprising:

determining the smoothened IMU poses and the smoothened final radar poses based on a SLERP based moving average filter.

20. A calibration pipeline for estimating six degrees of freedom (6DoF) alignment parameters for an autonomous vehicle, the calibration pipeline comprising:

an automated driving controller instructed to:

receive inertial measurement unit (IMU) poses and final radar poses, wherein the IMU poses are based on data collected by an IMU and a global positioning system (GPS) of the autonomous vehicle and the final radar poses are based on data collected one or more radar sensors of the autonomous vehicle;

determine smoothened IMU poses from the IMU poses and smoothened final radar poses from the final radar poses based on either a moving average filter or a moving median filter;

align the smoothened IMU poses and the smoothened final radar poses with one another to create a plurality of radar-IMU A, B relative pose pairs;

determining a solution yielding a threshold number of inliers of further filtered radar-IMU A, B relative pose pairs based on the plurality of radar-IMU A, B relative pose pairs;

randomly sample the further filtered radar-IMU A, B relative pose pairs with replacements more than two times to determine a stream of filtered radar-IMU A, B relative pose pairs;

solve for a solution X for the stream of filtered radar-IMU A, B relative pose pairs, wherein the solution X indicates the 6DoF alignment parameters, and wherein the solution X indicates the 6DoF alignment parameters of the autonomous vehicle and the 6DoF alignment parameters represent radar-to-vehicle calibration parameters;

further refine the solution X by performing a non-linear minimization of an error term based on a non-linear optimization routine, wherein the non-linear optimization routine is executed until convergence of the error term; and align the one or more radar sensors with a center of gravity of the autonomous vehicle based on the 6DoF alignment parameters.

* * * * *